(12) United States Patent
Kolb

(10) Patent No.: US 6,517,102 B2
(45) Date of Patent: Feb. 11, 2003

(54) GAS BAG MODULE

(75) Inventor: Klaus Kolb, Schwäbisch Gmünd (DE)

(73) Assignee: TRW Occupant Restraint Systems GmbH & Co. KG, Aldorf (DE)

( * ) Notice: Subject to any disclaimer, the term of this patent is extended or adjusted under 35 U.S.C. 154(b) by 0 days.

(21) Appl. No.: 09/828,563

(22) Filed: Apr. 6, 2001

(65) Prior Publication Data

US 2001/0030417 A1 Oct. 18, 2001

(30) Foreign Application Priority Data

Apr. 18, 2000 (DE) ......................................... 200 07 141

(51) Int. Cl.⁷ .............................................. B60R 21/22
(52) U.S. Cl. .................................. 280/728.3; 280/730.2
(58) Field of Search ........................... 280/728.2, 728.3, 280/730.1, 730.2, 749, 743.1

(56) References Cited

U.S. PATENT DOCUMENTS

| | | | | |
|---|---|---|---|---|
| 5,645,295 A | * | 7/1997 | White et al. ............. | 280/730.2 |
| 5,669,627 A | * | 9/1997 | Marjanski et al. ........ | 280/728.3 |
| 5,676,393 A | * | 10/1997 | Rose ....................... | 280/728.3 |
| 5,755,457 A | * | 5/1998 | Specht .................... | 280/728.2 |
| 5,772,238 A | | 6/1998 | Breed et al. | |
| 5,791,680 A | * | 8/1998 | Dyer ....................... | 280/728.3 |
| 5,791,683 A | * | 8/1998 | Shibata et al. ........... | 280/730.2 |
| 5,884,937 A | * | 3/1999 | Yamada .................... | 280/730.2 |
| 5,921,575 A | * | 7/1999 | Kretschmer et al. ..... | 280/728.2 |
| 5,921,576 A | * | 7/1999 | Sinnhuber ................ | 280/730.2 |
| 6,059,311 A | * | 5/2000 | Wipasuramonton et al. ..... | 280/729 |
| 6,103,984 A | * | 8/2000 | Bowers et al. ........... | 280/730.2 |
| 6,149,185 A | * | 11/2000 | White et al. ............. | 280/728.3 |
| 6,170,861 B1 | * | 1/2001 | Tietze ..................... | 280/730.2 |
| 6,179,324 B1 | * | 1/2001 | White et al. ............. | 280/730.2 |
| 6,189,917 B1 | * | 2/2001 | Tschaeschke ............ | 280/728.3 |
| 6,199,896 B1 | | 3/2001 | Brucker | |
| 6,209,907 B1 | * | 4/2001 | Fischer .................... | 280/728.3 |
| 6,220,623 B1 | * | 4/2001 | Yokota .................... | 280/728.2 |
| 6,224,091 B1 | * | 5/2001 | Eyrainer et al. ......... | 280/730.2 |
| 6,333,515 B1 | * | 12/2001 | Kubota et al. ........... | 280/730.2 |
| 6,336,651 B1 | * | 1/2002 | Mramor et al. .......... | 280/728.2 |
| 6,340,169 B1 | | 1/2002 | Tietze | |
| 6,447,005 B2 | * | 9/2002 | Alb et al. ................. | 280/730.2 |

FOREIGN PATENT DOCUMENTS

| | | |
|---|---|---|
| DE | 29807098 | 9/1998 |
| DE | 19812737 | 5/1999 |
| EP | 0952044 A1 | 10/1999 |
| EP | 0965497 A1 | 12/1999 |
| EP | 0978422 A2 | 2/2000 |
| JP | 05345555 A * | 12/1993 |
| JP | 06001198 A * | 1/1994 |
| WO | WO9942334 | 8/1999 |
| WO | WO9951457 | 10/1999 |

* cited by examiner

*Primary Examiner*—Paul N. Dickson
*Assistant Examiner*—Deanna Draper
(74) *Attorney, Agent, or Firm*—Tarolli, Sundheim, Covell, Tummino & Szabo L.L.P.

(57) ABSTRACT

The invention relates to a gas bag module for a vehicle occupant restraint system, in particular a side gas bag module extending along a roof frame of the vehicle. The gas bag module comprises a gas bag and a housing with two separate side pieces which define an ejection channel for the gas bag. One of the side pieces is to be located close to the frame and the other of the side pieces is to be located close to an interior of the vehicle. The side pieces each have upper and lower ends constituting marginal sections. The side piece close to the interior is constructed to be so elastic and to have such a shape adapted to a shape of the side piece close to the frame, that the side piece close to the interior only rests against an outside of side piece close to the frame and embraces the latter in the manner of a clip.

16 Claims, 1 Drawing Sheet

GAS BAG MODULE

TECHNICAL FIELD

The invention relates to a vehicle occupant restraint system, in particular to a gas bag module for a vehicle occupant restraint system, and more particular to an elongated side gas bag module.

BACKGROUND OF THE INVENTION

Side gas bags which in the case of a side impact onto a vehicle protect the head of a vehicle occupant from injuries, are in the meantime being incorporated as a standard fitting in motor vehicles. In a known embodiment, such gas bags are arranged along the roof frame of the vehicle and unfold for example in the manner of a curtain between the side window and the head of the vehicle occupant.

It is important that the gas bag is fully protected up to its unfolding, in order to avoid damage. For this purpose, the gas bag is arranged in a housing, which is often produced from plastic by the injection molding process, the side pieces of which also at the same time form a so-called ejection channel which on activation of the gas bag module provides the unfolding direction of the gas bag. In order to reduce the manufacturing costs, it is favorable to produce the housing from two parts, for example a plastic part designated here as a side piece close to the (vehicle) frame and a side piece designated here as close to the (passenger) interior. The gas bag module is fastened to the vehicle here, for example to its roof frame, such that the side piece close to the frame points to the nearest vehicle wall or to the roof frame and the side piece close to the interior is directed to the interior of the vehicle. Such a housing is described for example in EP 0 952 044 A1. Here, the side pieces are fastened to each other at their edges by means of clip connections. To open the housing to release the gas bag, it is therefore necessary for the clip connection to be designed such that the housing opens reliably by the pressure exerted by the gas bag.

BRIEF SUMMARY OF THE INVENTION

The invention proposes a gas bag module with a housing, which makes possible both a reliable opening to release the gas bag and also a simple installation of the gas bag module.

This is achieved in a gas bag module of the above-mentioned type which comprises a gas bag and a housing with two separate side pieces which define an ejection channel for the gas bag. A first side piece is for being located close to the frame and a second side pieces is for being located close to an interior of the vehicle. The side pieces each have upper and lower ends constituting marginal sections. The side piece which is for being located close to the interior is constructed to be so elastic and to have such a shape adapted to a shape of the side piece for being arranged close to the frame that the side piece close to the interior only rests against an outside of side piece close to the frame and such as to embrace the latter in the manner of a clip. Owing to the elasticity of the side piece close to the interior, the latter can be easily bent up in order to place it onto the side piece close to the frame, and is then fixed in the installed state when both side pieces are placed onto each other, by its elastic action. In this way, the installation of the gas bag module is simplified. Owing to its elasticity, the side piece close to the interior, on unfolding of the gas bag, can be pressed by the latter to the side, in order to clear the way. Due to the overlapping which occurs through the embracing of the marginal sections, the housing is fully closed before the activation of the gas bag module and protects the gas bag from contamination and damage. In the module according to the invention, the two half shells which together form the housing, as a whole form a plug connection which produces a better holding together of the housing parts than in the case of pins formed on at intervals, which form the plug connection.

The side piece close to the frame is preferably constructed so as to be inherently stable. Preferably the side piece close to the frame has a base plate, adjoining which are its marginal sections, and the marginal sections of the side piece close to the interior engage in installed state before an activation of the gas bag module on the rear face of the base plate. In this way, it is ensured that the marginal sections of the side piece close to the interior engage behind the side piece close to the frame so far that the two side pieces remain connected with each other.

Preferably, the side pieces have a C-shaped cross-section. In this way, the straight base plates of the side pieces can form an ejection channel for the gas bag, whilst the connection of the two side pieces with each other and a closing of the housing can take place via the bent marginal sections.

In a preferred embodiment of the invention, the side pieces are fixed to each other in the region of the marginal sections only by the clip-like embracing. This serves to simplify the installation of the two side pieces, because no slip connections have to be brought into engagement. The two side pieces enter into a snap fit through the embracing of the side piece close to the frame by the side piece close to the interior, by which fit the two side pieces are connected with each other. A further advantage lies in that to open the housing on emergence of the gas bag, no clip connection has to be decoupled, but rather only the lower marginal sections of the side pieces have to be displaced with respect to each other.

The cross-section of the marginal sections is preferably in the form of a circular arc. It is particularly preferable for the cross-sections of the respective overlapping marginal sections of the side piece close to the frame and of the side piece close to the interior to have concentric circular arcs. In other words, the marginal sections in the form of circular arcs, of the respectively lower and upper ends of the side piece close to the interior and close to the frame, are coordinated with each other such that after installation sections of the respective marginal sections lie directly on each other. Thus the housing is closed and the gas bag is protected from contamination and damage.

According to a preferred embodiment of the invention, the side piece close to the interior has a hinge so that a section of this side piece can be folded outwards to open the housing. This development facilitates the opening of the housing, in order to allow the gas bag to emerge. If the gas bag module is activated, the unfolding gas bag presses onto the lower ends and hence onto the lower marginal sections of the two side pieces, whereupon the side piece close to the interior is pressed outwards and swings open on its hinge toward the interior of the vehicle, in order to give way for the gas bag. The hinge is preferably arranged approximately in the center of the side piece close to the interior.

Preferably the hinge is a film hinge which is achieved by a reduction of the wall thickness of the side piece in this region.

To simplify the installation of the gas bag module, in a preferred embodiment a device is provided via which the side pieces can be fixed to each other during the composing of the side pieces. In a simple manner, such a device can be realized in that on one of the side pieces domes are formed which have recesses into which pins formed on the other side piece engage on installation of the gas bag module and thus can prevent an undesired displacement of the side pieces with respect to each other.

As the snap fit, which is brought about by the embracing of the side piece close to the frame by the side piece close to the interior, generally is not sufficient to hold the housing parts fastened to each other during the unfolding of the gas bag, a further fastening device is necessary. This fastening device is preferably a clamping connection which is preferably arranged outside the overlapping marginal sections.

In a preferred embodiment of the invention, the side piece close to the frame has formed-on domes with recesses and the side piece close to the interior can preferably be fastened to the side piece close to the frame in a simple and favorably-priced manner by plastic nails which can undergo a connection with the recesses.

DETAILED DESCRIPTION OF THE PREFERRED EMBODIMENT

Figure 1:
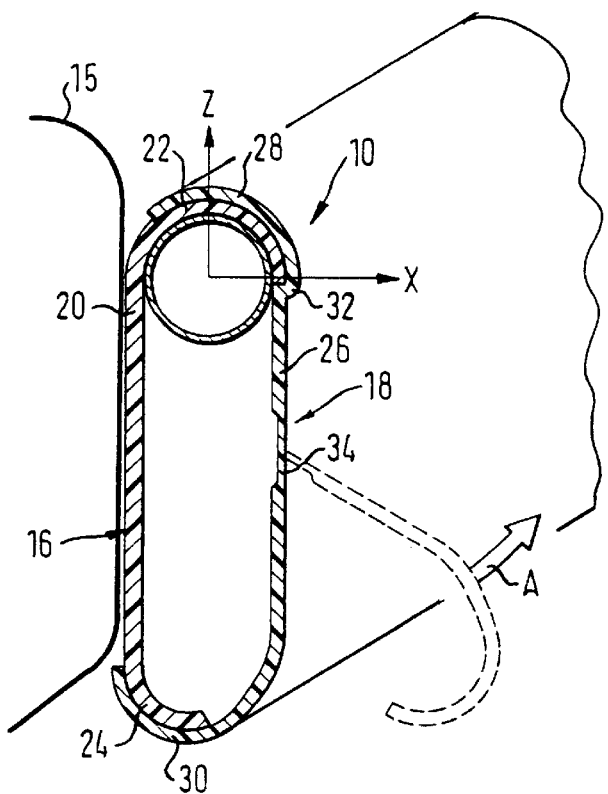
FIG. 1 shows a section through an occupant restraint system with a gas bag module according to the invention and FIG. 2 shows a section through a gas bag module according to the invention at the place of a fastening device, with inserted gas bag.

In the Figures, an occupant restraint system in the form of a side gas bag module 10 is shown in installed, i.e. composed, state. The gas bag module 10 has a gas lance 12 and a folded gas bag 14, which can be filled via openings in the gas lance. For reasons of clarity, the folded gas bag is only illustrated in FIG. 2. The gas lance 12 and gas bag 14 are surrounded by an elongated housing running along the roof frame, which consists of a side piece 16 close to the frame and a side piece 18 close to the interior.

Figure 2:
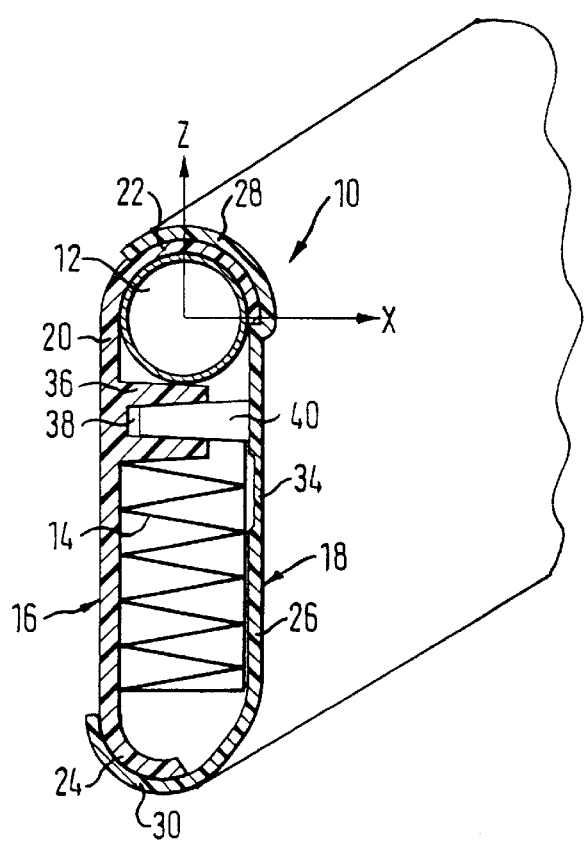

The gas bag module 10 is fastened in a known manner to a vehicle part 15, e.g. a roof frame shown diagrammatically in FIG. 2, and namely such that the (first) side piece 16 close to the frame is attached to the vehicle part, whilst the (second) side piece 18 close to the interior faces towards the interior of the vehicle. In the Figures, this is shown by the arrow direction X which points towards the interior of the vehicle, and the arrow direction Z which points vertically upwards.

The side piece 16 close to the frame has a vertically oriented base plate 20, to which an upper marginal section 22 with a cross-section in the form of a circular arc adjoins, the marginal section 22 extending in X-direction approximately across a semi-circle. The lower end of the base plate 20 is followed by a lower marginal section 24, likewise with a cross-section in the form of a circular arc, which extends approximately across a quarter-circle. The side piece 16 close to the frame is preferably injected from an inherently stable plastic with a relatively thick wall thickness of for example 2 mm.

The side piece 18 close to the interior likewise has a base plate 26 extending vertically, adjoining which at the top is an upper marginal section 28 and at the bottom a lower marginal section 30. The upper marginal section 28 preferably extends across approximately 120°, whilst the lower marginal section 30 preferably has an approximately semicircular cross-section.

The side piece close to the interior is formed from an elastic plastic with a somewhat smaller wall thickness than the side piece close to the frame, for example with a wall thickness of 1.5 mm.

Both side pieces are preferably produced by injection molding.

At the transition between the base plate 26 and the upper marginal section 28, the side piece 18 close to the interior has a projection 32 which in the installed state lies against the outer edge of the upper marginal section 22 of the side piece 16 close to the frame and serves to establish the position of the side piece 18 close to the interior on the side piece 16 close to the frame.

The marginal sections 28 and 30 of the side piece 18 close to the interior engage behind the side piece 16 close to the frame, the marginal sections 28, 30 extending substantially up to the rear face of the base plate 20 and thus bringing about a clip effect. Owing to the smaller extent of the marginal section 24 of the side piece 16 close to the frame, the overlapping region of the two lower marginal sections 24 and 30 is smaller than the overlapping of the two upper marginal sections 22 and 28.

The side piece 18 close to the interior has approximately in the center of its base plate 26 a film hinge 34, which is constructed as a region with reduced wall thickness of for example 0.8 mm. On this film hinge 34, the lower part of the side piece 18 close to the interior can swing open towards the interior in arrow direction A. This state is shown in FIG. 1 in dashed lines.

Outside the marginal sections, devices are arranged for fixing the two side pieces 16, 18 during installation (see FIG. 2). The side piece 16 close to the frame has pin-like domes 36 with conical recesses 38, which can be constructed in one piece with the side piece 16. The recesses preferably have a cone angle of 5°. On the side piece 18 close to the interior, corresponding pins 40 are formed, which can undergo a clamping connection with the recesses 38. Preferably several fixing devices are provided, which are arranged approximately at a distance of 250 mm in longitudinal direction (perpendicular to the section plane shown). The function of this fixing device is described in further detail below.

In order to fasten the two side pieces securely to each other, further fastening devices (not shown) are provided. Preferably, these consist for the one part likewise of domes formed on the side piece close to the frame, which, however, extend further toward the side piece close to the interior than the domes 36, so that the spacing between the free end of the dome and the inner face of the base plate of the side piece close to the interior amounts to approximately 2 mm. Also these domes have recesses, of course with a smaller diameter than the recesses 38. These domes are arranged approximately at a distance of 300 mm in longitudinal direction. Through corresponding openings in the side piece close to the interior, plastic nails are introduced, in order to achieve a firm connection of the two side pieces with each other via the clamping effect of the plastic nails in the recesses.

Of course, other fixing- and fastening devices are also conceivable, in particular the projections or pins can also be fastened on the respectively other side piece than the side piece described here. In the example shown here, the fixing- and fastening devices are arranged directly beneath the gas lance, but also other arrangements of course are within the scope of the invention.

For the installation of the gas bag module 10, the side piece 16 close to the frame is placed horizontally and fixed on a support which is not shown; then the gas lance 12 and the gas bag 14 are inserted and fastened in a known manner. Thereafter the side piece 18 close to the interior, beginning with the lower marginal section 30, is mounted so as to cover the side piece 16 close to the frame and the inserted gas bag 14 and the gas lance 12. In so doing, the side piece 18 close to the interior, with the subsequent pressing of the side piece 18 onto the side piece 16 is firstly bent up, so that the upper marginal section 28 can snap over the upper marginal section 22 of the side piece 16 close to the frame and embraces the lower marginal section 24 in the manner of a clip. Through the elastic clamping effect of the marginal sections 28, 30 of the side piece 18 close to the interior over the side piece 16 close to the frame, a snap fit arises which holds the side piece on the interior side fastened to the side piece 16 on the frame side.

In order to achieve the correct alignment of the side pieces with respect to each other in longitudinal direction and to achieve a pre-fixing of the side pieces with respect to each other, the pins 40 are firstly introduced into the recesses 38 during the placing of the side piece 18 close to the interior onto the side piece 16 close to the frame, and then the marginal section 28 is guided over the marginal section 22. The pins 40 are jammed in the recesses 38.

Finally, plastic nails (not shown) are pressed through openings (not shown) in the base plate 26 of the side piece 18 close to the interior into the recesses of the further domes (not shown) described above, in order to in this way fasten the two side pieces permanently to each other.

On activation of the gas bag module 10, gas flows through the gas lance 12 into the gas bag 14 and the latter begins to unfold. The base plates 20, 26 of the two side pieces 16, 18 here provide the unfolding direction for the gas bag 14 through the formation of an ejection channel. Through the pressure which the unfolding gas bag 14 exerts onto the lower marginal section 30 of the side piece 18 close to the interior, the lower part of the side piece 18 close to the interior swings on the film hinge 34 towards the interior of the vehicle (arrow direction A in FIG. 1), and the gas bag can emerge into the interior through the opening thus arising.

What is claimed is:

1. A gas bag module for a vehicle occupant restraint system, which module is an elongated side gas bag module extendable along a roof frame of said vehicle, said gas bag module comprising:
   a gas bag and
   a housing with separate first and second side pieces which define an ejection channel for said gas bag,
   said first and second side pieces each having first and second spaced apart ends constituting first and second marginal sections of each of said first and second side pieces,
   said first side piece being for location close to said frame,
   and said second side piece being for location close to an interior of said vehicle,
   said first and second marginal sections of said second side piece being elastic and having a shape cooperating with a shape of said first and second marginal sections of said first side piece and said first and second marginal sections of said second side piece rest against an outer surface of said first and second marginal sections, respectively, of said first side piece, and
   said first and second marginal sections of said second side piece embracing said first and second marginal sections of said first side piece and forming two snap connections comprising a clip connection fixing said first and second side pieces together.

2. The gas bag module according to claim 1, wherein said first side piece has a base plate and wherein said first and second marginal sections of said second side piece, in an installed state before an activation of said gas bag module, engage on a rear face of said base plate.

3. The gas bag module according to claim 1, wherein said side pieces each have a C-shaped cross-section.

4. The gas bag module according to claim 1, wherein said marginal sections of said side pieces in said installed state are only fixed to each other by said two snap connections.

5. The gas bag module according to claim 1, wherein a cross-section of said first and second marginal sections of said first and second side pieces is in the form of a circular arc.

6. The gas bag module according to claim 5, wherein in said installed state said marginal sections of said first and second side pieces overlap each other and wherein said cross-sections of said overlapping marginal sections of said first side piece and of said second side piece are concentric circular arcs.

7. The gas bag module according to claim 1, wherein said second side piece has a hinge and a section of said second side piece swivels open at said hinge towards the vehicle interior to open said housing.

8. The gas bag module according to claim 7, wherein said hinge is a film hinge.

9. The gas bag module according to claim 1, wherein at least one device is provided in order to fix said side pieces to each other during assembly of said gas bag module and prior to installation of said gas bag module into the vehicle.

10. The gas bag module according to claim 9, wherein domes are provided which are formed on one of said side pieces and have recesses, and wherein pins are provided which are formed on the other of said side pieces, said device consisting of said domes and said pins which engage with each other, said pins being received in said recesses.

11. The gas bag module according to claim 1, wherein at least one fastening device is provided via which said side pieces are connected with each other at a location other than said overlapping marginal sections.

12. The gas bag module according to claim 11, wherein said fastening device is a clamping device.

13. The gas bag module according to claim 12, wherein said first side piece has domes with recesses and wherein said second side piece is fastened to said first side piece by nails which are received in said recesses to connect the side pieces together.

14. The gas bag module according to claim 1, wherein the gas bag, upon inflation extends from the module in a direction vertically downwards relative to the roof frame of the vehicle and the first and second marginal sections of the first and second side pieces are spaced apart from one another along said direction.

15. A gas bag module for a vehicle occupant restraint system, which module is an elongated side gas bag module extendable along a roof frame of said vehicle, said gas bag module comprising:
   a gas bag and
   a housing with separate first and second side pieces which define an ejection channel for said gas bag,.
   said first and second side pieces each having first and second spaced apart ends constituting first and second marginal sections, each of said side pieces having a C-shaped cross-section,
   said first side piece being for location close to said frame,
   and said second side piece being for location close to an interior of said vehicle, said first and second marginal sections of said second side piece being elastic and having a shape cooperating with a shape of said first and second marginal sections of said first side piece and said first and second marginal sections of said second side piece rest against an outer surface of said first and second marginal sections, respectively, of said first side piece and said first and second marginal sections of said second side piece embracing said first side piece and forming two snap connections comprising a clip connection fixing said first and second side pieces together.

16. A gas bag module for a vehicle occupant restraint system, which module is an elongated side gas bag module extendable along a roof frame of said vehicle, said gas bag module comprising:

a gas bag and a housing with separate first and second side pieces which define an ejection channel for said gas bag, said first and second side pieces each having first and second spaced apart ends constituting first and second marginal sections, a cross-section of each of said first and second marginal sections of said side pieces being in the form of a circular arc, said first side piece being for location close to said frame, and said second side piece being for location close to an interior of said vehicle, said first and second marginal sections of said second side piece being elastic and having a shape cooperating with a shape of said first and second marginal sections of said first side piece and said first and second marginal sections of said second side piece rest against an outer surface of said first and second marginal sections, respectively, of said first side piece and said first and second marginal sections of said second side piece embracing said first side piece and forming two snap connections comprising a clip connection fixing said first and second side pieces together.

* * * * *